(12) United States Patent
Bley et al.

(10) Patent No.: US 7,505,874 B2
(45) Date of Patent: Mar. 17, 2009

(54) METHOD FOR ESTABLISHING A SENSOR NETWORK

(75) Inventors: Bert Bley, Essen (DE); Manfred Gronauer, Essen (DE); Bernd Kauffmann, Unna (DE); Thorsten Rische, Bochum (DE)

(73) Assignee: ista International GmbH (DE)

( * ) Notice: Subject to any disclaimer, the term of this patent is extended or adjusted under 35 U.S.C. 154(b) by 49 days.

(21) Appl. No.: 11/553,244

(22) Filed: Oct. 26, 2006

(65) Prior Publication Data

US 2007/0094386 A1    Apr. 26, 2007

(30) Foreign Application Priority Data

Oct. 26, 2005    (DE) .................... 10 2005 051 562

(51) Int. Cl.
*G06F 11/00* (2006.01)
*G06F 15/00* (2006.01)

(52) U.S. Cl. .................... 702/188; 702/116; 702/117; 702/189; 709/226

(58) Field of Classification Search ......... 702/116–123, 702/127, 188, 189; 709/224, 226, 206
See application file for complete search history.

(56) References Cited

U.S. PATENT DOCUMENTS

2003/0078062 A1*   4/2003   Burr .................... 455/502
2003/0079003 A1    4/2003   Burr

FOREIGN PATENT DOCUMENTS

| EP | 1385300 A1 | 1/2004 |
|---|---|---|
| EP | 1513288 A2 | 3/2005 |
| WO | WO2006/054190 A1 | 5/2006 |

* cited by examiner

*Primary Examiner*—Eliseo Ramos Feliciano
*Assistant Examiner*—Phuong Huynh
(74) *Attorney, Agent, or Firm*—Walter G. Hanchuk; Chadbourne & Parke LLP.

(57) ABSTRACT

The present invention relates to a method for establishing a sensor network having multiple sensor nodes, sensor nodes being able to connect to one another to transmit sensor data to a central receiving node, and information, in particular time information, being in stored in every sensor node from other neighboring sensor nodes lying in the reception area of a sensor node, on the basis of which a sensor node determines when to connect to another sensor node, initial information in the sensor node (S2) being formed by information from a mobile installation device (MGW), which is transmitted into a new sensor node (S2) during the installation thereof, the information particularly being provided in the form of a table.

21 Claims, 1 Drawing Sheet

METHOD FOR ESTABLISHING A SENSOR NETWORK

RELATED APPLICATIONS

This disclosure claims priority to German Patent Application No. 102005051562.2 filed on Oct. 26, 2005, which is hereby incorporated by reference.

FIELD

The present invention relates to a method for establishing a sensor network having multiple sensor nodes, sensor nodes being able to connect to one another to transmit sensor data to a central receiving node, and information, particularly time information, being stored in each sensor node from other neighboring sensor nodes lying in the reception area of a sensor node, on the basis of which a sensor node determines when it connects with another sensor node.

Sensor networks of this type are used, for example, in the field of consumption data detection, e.g., in the detection of power consumption, gas consumption, heating consumption, water consumption, or other resources for which a receiver is charged by a provider.

BACKGROUND

In order to avoid readout personnel having to come into the various individual residences in order to read out consumption meters separately on location, linking the devices for consumption data detection into a network, in which these devices may communicate with one another, is practiced in the prior art. Since devices for consumption data detection of this type are typically devices having sensors, these are also referred to as sensor nodes in the framework of the network group.

Typically, in sensor networks of this type, the consumption data detected by the sensor nodes situated in the network is conducted using a relay via the individual sensor nodes to a central detection point, where the individual consumption data is collected and may then be provided for accounting. For example, readout personnel may retrieve the data at the central detection point; it is also possible if necessary to relay the centrally summarized data via long-distance data transmission.

Relaying the individual data via the different sensor nodes is known in a sensor network of this type having multiple sensor nodes, which means that a sensor node may operate both as a transmitting sensor node and also as a receiving sensor node.

In the example of the above-mentioned prior art, a sensor node may thus also represent a central collection point or may form an arbitrary sensor node of the sensor network, via which the data is relayed.

Furthermore, it is known in sensor networks of this type that multiple sensor nodes may wish to connect to other sensor nodes in order to relay accumulated data about consumption values or possibly also other data, such as status messages or error messages. For this purpose, a path optimization may be selected on the basis of predefined criteria in regard to the transport path of the data by the individual sensor nodes, it being possible that multiple sensor nodes wish to communicate with a specific other sensor node, since the path via this special sensor node is classified as optimal or at least preferred in relation to other paths.

It is known in the prior art that sensor nodes must synchronize in order to be able to perform a data exchange following this synchronization in the framework of a predetermined exchange protocol.

SUMMARY

For energetic reasons, a sensor node first sends out at least one synchronization telegram, which signals to other sensor nodes which receive a synchronization telegram of this type that this sensor node is available for receiving consumption data or any other data or communications.

In order to be able to receive a synchronization telegram of this type, the requirement exists that other sensor nodes are ready to receive at the instant of the transmission of this synchronization telegram, for which a receiving sensor node typically activates its internal receiving unit over the period of a receiving window. For energetic reasons, the time period of such a receiving window is limited.

Accordingly, in order to achieve a time overlap between transmission of the synchronization telegram and an opened receiving window, providing internal clocks or clock systems in the individual sensor nodes is known. Information may thus exist in the sensor nodes about when a specific sensor node transmits at least one synchronization telegram and when another sensor node must open its receiving window in order to receive such a synchronization telegram.

After transmitting at least one synchronization telegram, this transmitting sensor node typically switches to receive for a time period which may particularly be predetermined, in order to then be able to receive telegrams within this time period which are transmitted from surrounding sensor nodes, which wish to relay data, such as consumption data or other information, to the sensor node which has transmitted at least one synchronization telegram.

In the framework of the following further description of the present invention, a telegram, such as a synchronization telegram, is understood as a closed package of any type of data that is communicated between two nodes of the network. Correspondingly, the data may be status data, synchronization data, consumption data, or other data.

In an existing sensor network, the above-mentioned information about the chronological sequence of the transmission of synchronization telegrams and opening of receiving windows is provided internally in the particular sensor nodes. The information is provided, for example, in that a sensor network examines itself, i.e., for example, some sensor nodes transmit multiple synchronization telegrams and some sensor nodes hold their receiving windows open longer than is typical in order to increase the probability of an overlap of telegram and window. The sensor nodes of a sensor network may thus transmit the required chronological information themselves. However, ascertainment in this way is costly, particularly from an energetic viewpoint.

The object of the present invention is to provide a method, using which an original initialization of a sensor network may be performed in a simple way, particularly to preserve the limited energy reserves of the sensor nodes provided in the network.

This object is achieved by a method in which initial information in a sensor node is formed by information from a mobile installation device, this information being transmitted into a new sensor node during the installation thereof. In particular, information of this type may be provided in the form of a table. However, any other type of organization of information of this type is also possible in the scope of the present invention.

BRIEF DESCRIPTION OF THE DRAWINGS

The accompanying appendices and/or drawings illustrate various non-limiting, example, inventive aspects in accordance with the present disclosure.

DETAILED DESCRIPTION

Figure 1:
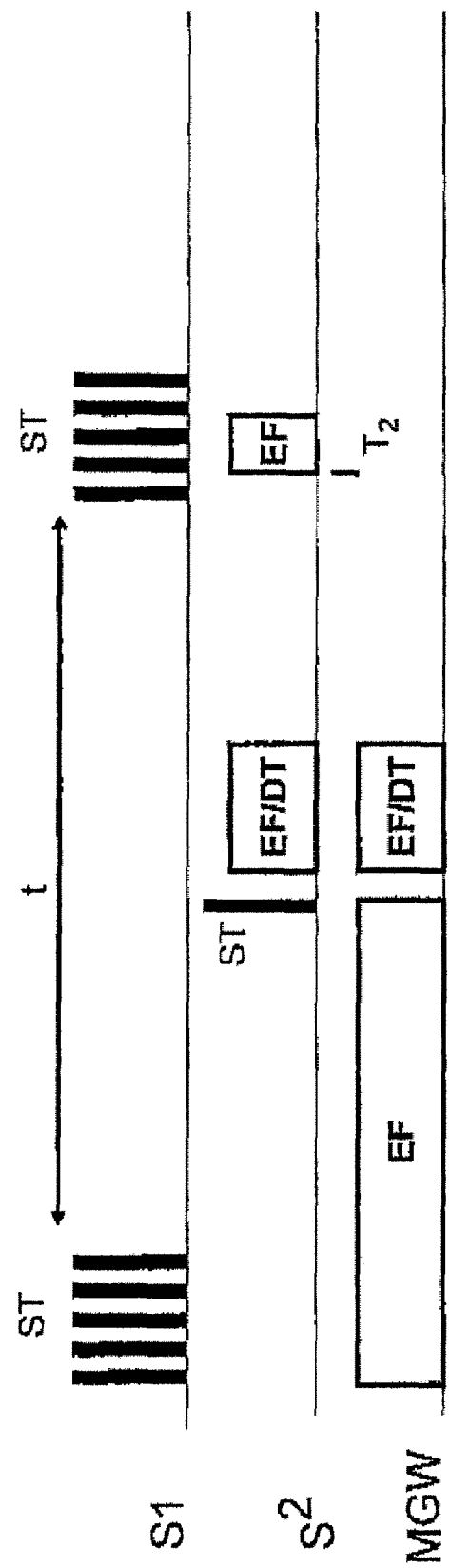
FIG. 1 shows a schematic illustration of the exchange of required information between an existing sensor node S1 and a sensor node S2 to be newly installed, this installation being performed with the aid of an installation device MGW (mobile gateway).

The idea in the method according to the present invention is to avoid a type of self-examination, as was described above in the prior art, since this self-examination is often very energetically costly. This is achieved in that during the establishment of a sensor network, a technician who performs this establishment may carry a mobile installation device with him, the required information for first putting a sensor node into operation being provided in this installation device. This information, which is provided in an installation device, may thus be transmitted during the installation of a new sensor node, e.g., by radio, possibly also via wire-bound or optical transmission.

This required information is essentially time information for the required above-mentioned synchronization of two sensor nodes in order to determine the time when one of the sensor nodes transmits at least one synchronization telegram and when at least one other sensor node opens a receiving window, in order to receive such a synchronization telegram and subsequently perform a data exchange. An installation device, which may be used in the scope of this method according to the present invention, thus preferably also comprises an internal clock or a clock system in order to achieve a chronological equalization between a newly installed sensor node and all sensor nodes previously installed in the network.

Thus, according to a preferred embodiment of the method according to the present invention, the information in the installation device which is to be transmitted to a newly installed sensor node is automatically adapted, e.g., on the basis of the reception of data, particularly synchronization telegrams from sensor nodes already installed in the network, which are located in the reception range of the installation device.

It is thus to be assumed that an installation device essentially has identical reception properties as a sensor node to be installed, so that those already installed sensor nodes, which are receivable by the installation device, may also be received by the sensor node, which is to be newly installed by an installer. This information, e.g., time information, which an installation device receives on the basis of the reception from already installed sensor nodes, may thus be transmitted to a sensor node to be newly installed, without this sensor node having to be active in an energetically costly way to generate this information itself from the reception.

The energetically costly generation of the required information is correspondingly performed according to the essential aspect of the present invention by the installation device, which may be carried along by an installer. The installation device accordingly has essentially the same properties in regard to reception and transmission as a sensor node and may form a mirror of the information, which is used by the sensor node to be newly installed.

According to a preferred refinement of the method according to the present invention, at least one item of information about a time deviation between the internal clocks of the new sensor node and at least one already existing sensor node may be stored in a sensor node to be newly installed, in particular in a table. For this purpose, a time deviation may be ascertained from a time difference of the internal clock of the installation device to the internal clock of at least one sensor node already provided in the sensor network in its reception range and a time difference of the internal clock of the installation device to the internal clock of the sensor node to be newly installed, the time deviation being transmitted at least into the new sensor node after being ascertained.

On the basis of this procedure, there is thus information about the current status of the clocks present in each of two observed sensor nodes, so that in consideration of this information, the sensor node to be newly installed may determine the position of its receiving window to be opened in order to receive at least one synchronization telegram of another sensor node. For this purpose, the accordingly required information for all or possibly only selected sensor nodes which are located in the reception area of this new sensor node is provided to the sensor node to be newly installed.

Thus, for example, using the installation device, the particular internal clock deviation to the clock of the installation device may be determined by receiving synchronization telegrams of all sensor nodes up to this point, so that in this way the particular time deviation to the clock of the new sensor node may be ascertained and transmitted thereto.

Therefore, there is at least sufficient information to achieve unidirectional data exchange between these considered sensor nodes. In order to also make bidirectional data exchange possible, the information that is provided to a sensor node to be newly installed may preferably also be transmitted to those sensor nodes, which are already installed in the network. This may either be performed by the installation device or by the newly installed sensor node, since it now has the required information to connect to the already existing sensor nodes.

In addition to information about the time deviation of the particular internal clocks of sensor nodes in a network, the problem may also arise in sensor networks of this type that, for example, the particular internal clocks not only have different counts because of different environmental conditions in the individual sensor nodes, but also have different running speeds. Accordingly, when observing two internal clocks of particular sensor nodes, not only may a time deviation occur, i.e., a count deviation of the particular clocks, but rather also a running deviation, i.e., a speed difference in the particular clocks.

According to a further preferred method step provided according to the present invention, at least one item of information about a running deviation between the internal clocks of the new sensor node and at least one already existing sensor node may thus be stored in a sensor node to be newly installed, particularly in a table, it being preferable here for a running speed of the particular sensor node to be ascertained from at least one measurement of the spacing of sequential synchronization telegrams of the sensor node using an internal clock of the installation device and comparison of the measured spacing to a setpoint spacing.

In this way, it may be established at essentially every sensor node at what speed the particular internal clock of this observed sensor node runs. It may thus be known through a system preset, for example, through the clock of the installation device, what spacing is to exist between two sequential transmitted synchronization telegrams or even multiple synchronization telegrams.

If the concretely measured spacing of the synchronization telegrams is less, the internal clock of this observed sensor node will run more rapidly than desired, if the spacing is greater, however, this clock will run slower than desired. A conclusion may thus be drawn about the running speed of the internal clock of the sensor node and thus, if the same information is established for another sensor node, about a running deviation of the internal clocks of these two observed sensor nodes.

According to the method according to the present invention, a time deviation and/or running deviation of the internal clocks between a newly installed sensor node and at least one already existing sensor node is preferably transmitted to the sensor node to be newly installed and especially preferably also to at least one existing sensor node by the installation device or by the newly installed sensor node. In this way, as already described above, communication of the sensor nodes in both directions is also made possible.

The information content which exists in a sensor node automatically rises with every newly installed sensor node, since this newly obtained information about time deviations and/or running deviations is transmitted at least into the one new sensor node, but preferably also into all remaining sensor nodes, at least those lying in the reception area of the installation area of the installation device.

In a sensor network, the sensor nodes typically transmit synchronization telegrams at a desired spacing in order to initiate communication among one another. This spacing is normally predefined in a specific time range to save energy.

In order to gather the required information as rapidly as possible during the installation, i.e., the establishment of a new sensor network, after an installation of a new sensor node, this new sensor node may perform a transmission of synchronization telegrams whose relative spacing is shortened in relation to normal operation in order to achieve rapid adaptation of the information in the installation device using information about the new sensor node and possibly already installed sensor nodes.

Such an installation operation of a sensor node having shortened period duration between two synchronization telegrams may be preset manually by an installer, for example, also by programming via the installation device, or a sensor node to be newly installed may automatically go into operation of this type upon being switched on for the first time and only enter normal operation after a specific operating time.

According to a refinement of the method, information about all sensor nodes located in the reception range of the installation device may be collected in the installation device, only information about sensor nodes selected there from being transmitted to a sensor node to be newly installed. In particular, this information may, for example, be transmitted into a table of this sensor node to be newly installed.

Thus, a pre-selection may also already be performed, for example, by the installer, who may possibly influence this selection in order to establish possible transmission paths between the new sensor node and already existing sensor nodes. Obviously, a sensor node to be newly installed may only communicate with those other sensor nodes of the network to which corresponding information, e.g., information about time deviations and/or running deviations of the particular clocks of other sensor nodes, has been transmitted.

Accordingly, if only selected information on specific sensor nodes is transmitted to the sensor node to be newly installed, this new sensor node may also only connect to those sensor nodes from which the corresponding information originates. In addition to the possibility of the installer performing the selection manually if necessary, the installation device may perform the selection internally in accordance with preset parameters, for example, on the basis of an evaluation of the possible transmission paths between the new sensor node and already existing sensor nodes. The possibility also exists of performing this selection if necessary by a sensor node to be newly installed or also by already existing sensor nodes. For example, a transmission path between two sensor nodes may be evaluated using an installation device or a sensor node located in the network (existing node or new node), e.g., on the basis of the signal quality. Then, from the set of all receivable sensor nodes, those at which the best reception quality exists may be ascertained and the information on these nodes may be transmitted to the new node and possibly also the existing nodes.

In addition to the above-mentioned information, in the method according to the present invention, the information in the installation device and/or a table may also comprise, in addition to a time deviation and/or running deviation, statements about the hierarchical level and/or the reception quality of multiple other sensor nodes lying in the reception range of the new sensor node. Thus, the information, which has been gathered in a sensor node using the installation device, may be decisive for the establishment and structuring of the network, for example, because the hierarchical level of a sensor node to be newly installed is at least initially established by this information.

As already noted at the beginning, for this purpose, a copy of the information, which is to be transmitted into a new sensor node, may be retained in the installation device. Accordingly, the installation device temporarily operates precisely like a sensor node to be newly installed and transmits the data to the same sensor nodes after it is put into operation. In particular since the installation device is carried along in a mobile way with a technician, it is in the immediate environment of a sensor node to be newly installed and accordingly has essentially identical receiving properties as the sensor node to be newly installed, so that as described above, the surroundings may first be monitored for existing nodes by the installation device, in order to then transmit this information as described above to the new node, without this node having to expend any energy to collect this required information.

The information, which is then provided in a sensor node, for example, in the form of a table, may comprise time information and possibly transmission path information about possible transmission paths of a sensor node. This results essentially because clock information (time deviation and/or running deviation) of those sensor nodes, which lie in the reception range, is included in the information and, in addition, this information may be subjected to a further evaluation, so that only some of the possible sensor nodes are concretely used for relaying or transmitting data.

This may be performed, for example, by assigning a status to the information, from which it may be seen whether or not a data relay is to be performed to the affected sensor node to which the corresponding information correlates. This status assignment may, as described above, be ascertained on the basis of an estimation of the reception quality between two observed sensor nodes.

Thus, for example, without restricting the present invention to this embodiment, with information about the total of 10 sensor nodes, actual data transmission may only be performed to those sensor nodes, which have a reception quality above a specific threshold, so that of the 10 total observed sensor nodes, possibly only 3 are considered for the actual data relay.

In particular, in the scope of the present invention, an initial information collection of this type provided by an installation device, for example, in the form of a table, may be dynamically changeable, such as if new information results, e.g., in that reception qualities change or possibly one sensor node fails or running speeds of the internal clocks change or the installation device is carried by the installer into other reception areas, in which the reception conditions have changed.

An exemplary embodiment of the present invention will be described in greater detail on the basis of the following figure.

FIG. 1 shows a schematic illustration of the exchange of required information between an existing sensor node S1 and a sensor node S2 to be newly installed, this installation being performed with the aid of an installation device MGW (mobile gateway).

In the example, it is assumed that a first sensor node S1 is initially put into operation by an installer during establishment of a sensor network. This sensor node will then transmit at least one synchronization telegram ST, in the present case a burst, i.e., a group of five synchronization telegrams ST, at periodic spacings t. The periodic spacing t may be reduced for this purpose in relation to a normal operation of this first sensor node in order to achieve the most rapid possible information relay during establishment of the sensor network.

If a further sensor node S2 is installed by the installer at another location, this sensor node may also transmit one or more synchronization telegrams ST, for example, in order to register and link into the existing network (at this instant only having the node S1), which is performed using the installation device MGW.

It is recognizable here that in the installation operation, the installation device MGW opens a receiving window, which is sufficiently long that it offers the possibility of receiving synchronization telegrams both from already existing network nodes in the network, here the sensor node S1, and also from the sensor node S2 to be newly installed within the time period of this reception window.

This is recognizable in FIG. 1 in that, in relation to the time axis, an overlap of the reception window EF exists both with the one synchronization telegram ST of the node S2 and also in relation to the last two synchronization telegrams ST of the sensor node S1. Therefore, information about the internal clock of the sensor node S1 may be transmitted via a synchronization telegram ST or also a separate data telegram (not shown here) to the installation device MGW precisely like information about the internal clock of the sensor node S2 using the one received synchronization telegram ST of this node.

On the basis of the particular calculated differences or running deviations to the internally provided clock of the installation device MGW, the particular time or running deviation between the two observed internal clocks of the sensor nodes S1 and S2 may be determined. This information thus obtained about the time and running deviation may be transmitted on the basis of a data telegram DT, which the installation device MGW transmits, to the node S2 to be newly installed, which has opened a corresponding receiving window EF for this purpose after transmitting its synchronization telegram ST. Further data telegrams DT, e.g., status information may also be transmitted here from the node S2 to the installation device.

The sensor node S2 is now made capable through the newly received information, i.e., here particularly the required information about the time and running deviations of the clocks between the two sensor nodes S1 and S2, of opening a receiving window EF at the correct time T2, in order to receive a sensor telegram of the sensor node S1 already existing in the network in this receiving window and then operating a data exchange with the sensor node, which is not pictured in FIG. 1.

Through this method according to the present invention, the newly installed sensor node S2 is integrated into the existing network, now comprising the nodes S1 and S2, i.e., the node S2 may, for example, perform a communication with the node S1 in order to transmit consumption data thereto.

In order to also perform a data exchange in the other direction, i.e., from the node S1 to the sensor node S2, the required information may be relayed here, as noted in the general part, not only to the newly installed sensor node S2, but rather also to the already existing sensor node S1. Communication in both directions is thus made possible and the sensor network may possibly automatically decide after further installation of other network nodes in which direction a data exchange is optimal in order to transmit the data from the sensor node to a central data collection point, which may also be performed by one of the sensor nodes of the network.

The exemplary embodiment described here is not restricted to the installation of only two sensor nodes in a network, but rather, as previously described, further sensor nodes S3, S4, etc., may be added to the sensor network to be established in the same way, particularly iteratively; however, in a new sensor node SN to be considered, the particular time deviations and preferably running deviations of its internal clock to all internal clocks of the already existing sensor nodes S1 through SN-1 are determined, if these existing sensor nodes are in the reception range of the installation device MGW.

It is thus recognizable that the energy consumption, which essentially results from opening a receiving window for a long time in order to receive the synchronization telegrams of existing sensor nodes, is essentially rolled over completely to the temporarily used installation device MGW, without significantly accessing the energy resources of the sensor nodes to be installed. Thus, with minimum energy expenditure, an initial configuration of a sensor network to be newly established may be performed, the possibility then existing that the sensor network organizes itself according to predefinable rules and protocols and the information from the initial installation provided up to this point is changed automatically and dynamically.

What is claimed is:

1. A method for establishing a sensor network having multiple sensor nodes, comprising:

connecting sensor nodes to one another to transmit sensor data to a central receiving node;

storing information in each sensor node from other neighboring sensor nodes lying in the reception area of each sensor node, on the basis of which each sensor node determines when to connect to other sensor nodes;

forming initial information in a new sensor node using information from a mobile installation device, which is transmitted into the new sensor node during its installation storing at least one item of information about a time deviation between the internal clocks of the new sensor node and at least one already existing sensor node in the new sensor node, a time deviation being ascertained from a chronological difference of the internal clock of the installation device to the internal clock of at least one already existing sensor node in its reception area and a chronological difference of the internal clock of the installation device to the internal clock of the new sensor node; and transmitting the time deviation into the new sensor node.

2. The method according to claim 1, wherein the information stored in every sensor node from the neighboring sensor nodes comprises time information.

3. The method according to claim 1, wherein the initial information formed in a new sensor node using information from a mobile installation device is provided in the form of a table.

4. The method according to claim 1, wherein the information in the installation device is automatically adapted on the basis of the reception of data.

5. The method according to claim 4, wherein the reception of data comprises synchronization telegrams from already existing sensor nodes, which are located in the reception range of the installation device.

6. The method according to claim 1, wherein the information about a time deviation between the internal clocks of the new sensor node and at least one already existing sensor node is stored in a table.

7. The method according to claim 1, further comprising:
storing in a new sensor node, at least one item of information about a running deviation between the internal clocks of the new sensor node and at least one already existing sensor node, a running speed of either sensor node being ascertained from at least one measurement of the spacing of sequential synchronization telegrams of that sensor node using an internal clock of the installation device and a comparison of the measured spacing to a setpoint spacing.

8. The method according to claim 7, wherein at least one item of information about a running deviation between the internal clocks of the new sensor node and at least one already existing sensor node is stored in a table.

9. The method according to claim 1, further comprising:
transmitting a time deviation and/or running deviation, between a new sensor node and at least one already existing sensor node, by the installation device and/or by the new sensor node into at least one existing sensor node.

10. The method according to claim 9, wherein the transmission of a time deviation and/or running deviation allows communication between the sensor nodes in both directions.

11. The method according to claim 1, further comprising:
performing a transmission of synchronization telegrams whose relative spacing is shortened in relation to normal operation, after installation of a new sensor node, in order to obtain an adaptation of the information in the installation device using information about the new sensor node.

12. The method according to claim 1, further comprising:
collecting information about sensor nodes located in the reception range of the installation device in the installation device, information of sensor nodes selected therefrom being transmitted to a new sensor node in order to form information.

13. The method according to claim 12, wherein the information transmitted to a new sensor node is formed as a table of this sensor node.

14. The method according to claim 12, wherein a selection is performed on the basis of an evaluation of the possible transmission paths between the new sensor nodes and the already existing sensor nodes.

15. The method according to claim 1, wherein the information in the installation device and/or a table comprises, in addition to a time deviation and/or running deviation, statements about the hierarchical level and/or the reception quality of multiple other already existing sensor nodes lying in the reception range of the new sensor node.

16. The method according to claim 1, wherein the information in the installation device forms a copy of information to be transmitted into a new sensor node.

17. The method according to claim 16, wherein the information in the installation device comprises a table to be transmitted.

18. The method according to claim 1, wherein the information comprises transmission path information about possible transmission paths of a sensor node.

19. The method according to claim 18, wherein the information is a table.

20. A method for establishing a sensor network having multiple sensor nodes, comprising:
connecting sensor nodes to one another to transmit sensor data to a central receiving node;
storing information in each sensor node from other neighboring sensor nodes lying in the reception area of each sensor node, on the basis of which each sensor node determines when to connect to other sensor nodes;
forming initial information in a new sensor node using information from a mobile installation device, which is transmitted into the new sensor node during its installation; and
storing in a new sensor node, at least one item of information about a running deviation between the internal clocks of the new sensor node and at least one already existing sensor node, a running speed of either sensor node being ascertained from at least one measurement of the spacing of sequential synchronization telegrams of that sensor node using an internal clock of the installation device and a comparison of the measured spacing to a setpoint spacing.

21. The method according to claim 20, wherein at least one item of information about a running deviation between the internal clocks of the new sensor node and at least one already existing sensor node is stored in a table.

* * * * *